(12) United States Patent
Kato et al.

(10) Patent No.: US 7,054,865 B2
(45) Date of Patent: May 30, 2006

(54) INFORMATION RETRIEVAL APPARATUS

(75) Inventors: Yoshikazu Kato, Tokyo (JP); Takeshi Kanai, Chiba (JP)

(73) Assignee: Sony Corporation (JP)

(*) Notice: Subject to any disclaimer, the term of this patent is extended or adjusted under 35 U.S.C. 154(b) by 329 days.

(21) Appl. No.: 10/027,973

(22) Filed: Dec. 21, 2001

(65) Prior Publication Data
US 2002/0126547 A1    Sep. 12, 2002

(30) Foreign Application Priority Data
Dec. 25, 2000 (JP) .......................... P2000-392871

(51) Int. Cl.
*G06F 17/30* (2006.01)
(52) U.S. Cl. .................. 707/10; 707/7; 707/6
(58) Field of Classification Search ......... 707/1–104.1, 707/201; 345/127, 341, 349; 709/202

See application file for complete search history.

(56) References Cited

U.S. PATENT DOCUMENTS

| | | | | |
|---|---|---|---|---|
| 5,970,492 A | * | 10/1999 | Nielsen | 707/10 |
| 5,987,460 A | * | 11/1999 | Niwa et al. | 707/6 |
| 6,581,068 B1 | * | 6/2003 | Bensoussan et al. | 707/104.1 |
| 6,789,057 B1 | * | 9/2004 | Morimoto et al. | 704/2 |

\* cited by examiner

*Primary Examiner*—Jeffrey A. Gaffin
*Assistant Examiner*—Neveen Abel-Jalil
(74) *Attorney, Agent, or Firm*—Lerner, David, Littenberg, Krumholz & Mentlik, LLP

(57) ABSTRACT

An information retrieval apparatus includes an input unit from which information-retrieval information is input, database interfaces that can access databases, a display unit for displaying, in the form of a bar, information that is obtained by the access, a central processing unit (CPU) that can move a cursor for designating a position in the lengthwise direction of the information bar and that uses a database interface to retrieve, from the databases, information corresponding to the lengthwise position designated by the cursor. The information retrieved by the CPU is displayed on the display unit, and data can be retrieved without the user performing an input operation by using a keyboard or the like.

10 Claims, 11 Drawing Sheets

FIG. 2

| | DATABASE NAME | ABBREVIATION | LOCATION | INTERFACE | USER ID | PASSWORD | MEMO |
|---|---|---|---|---|---|---|---|
| A | TOWN PAGES | town.db | IP : 10. 123. 246. 1 : 82 | 010 | 9988765 | aBC012z | CHARGE-FREE |
| B | NEW-WORD DICTIONARY | neww.db | IP : 192. 168. 122. 41 : 1080 | 010 | YY0123 | Ace002z | PAYMENT BY CARD |
| C | SLANG DICTIONARY | slang.db | phone_to : 0378901234 | 135 | SnylPod | | SERVICE PERIOD 10:00 – 22:00 |
| D | ENGLISH-JAPANESE DICTIONARY PLUS | e2jp.db | men : extesion 013 | 001 | | | 10 MB |
| E | | | | | | | |

INFORMATION RETRIEVAL APPARATUS

BACKGROUND OF THE INVENTION

1. Field of the Invention

The present invention relates to an information retrieval apparatus suitable for, for example, an electronic dictionary apparatus which retrieves dictionary information stored in a memory.

2. Description of the Related Art

An electronic dictionary apparatus according to the related art which retrieves dictionary information stored in a memory requires a keyboard from which characters are input for retrieval.

The electronic dictionary apparatus has a problem of bad operability due to a time-consuming character-inputting operation using the keyboard because the characters must be input for retrieval by using the keyboard.

In addition, when information which is classified in the form of a tree structure is sequentially retrieved by using a cursor instead of inputting the characters by using the keyboard, for example, the character "hi" must be selected after selecting the "ha" column the Japanese syllabary, and words beginning with the character "hi" must be sequentially followed. Accordingly, this case has a problem of bad operability for an inputting or selecting operation for retrieval.

SUMMARY OF THE INVENTION

In view of the above problems, the present invention is made, and an object thereof is to provide an information retrieval apparatus having operability improved by performing visual retrieval without inputting characters.

To this end, according to an aspect of the present invention, an information retrieval apparatus for information retrieval from an information source is provided. The information retrieval apparatus includes an input unit in which a selectively inputting operation is performed, a database-access-interface unit which accesses a database as the information source for the information retrieval in response to the use of the input unit, a display unit for displaying information bar which is obtained by the accessing of the database, a cursor moving unit for moving a cursor in response to the use of the input unit in order to designate a position in the lengthwise direction of the information bar displayed on the display unit, and a retrieval unit for retrieving information corresponding to the designated lengthwise position from the database by using the database-access-interface unit. The retrieved information is displayed on the display unit.

Preferably, the lengthwise sections of the displayed information bar each have index-item information, and the display unit displays the index-item information corresponding to one lengthwise section in which the position in the lengthwise direction of the displayed information bar is designated by using the cursor.

The database-access-interface unit may access a built-in database of the information retrieval apparatus.

The database-access-interface unit may access a database outside the information retrieval apparatus.

The database-access-interface unit may use a network to access a database outside the information retrieval apparatus.

According to another aspect of the present invention, an information retrieval method for performing information retrieval from an information source is provided. The information retrieval method includes an input step in which a selectively inputting operation is performed, a display step for displaying, in the form of a bar, on a display unit, information which is obtained by using a database-access-interface unit to access a database as the information source for information retrieval in response to the execution of the input step, a cursor moving step for moving a cursor in response to the execution of the input step in order to designate a position in the lengthwise direction of the displayed information bar, and a retrieval step for retrieving information corresponding to the designated position from the database by using the database-access-interface unit. The retrieved information is displayed on the display unit.

Preferably, the lengthwise sections of the displayed information bar each have index-item information, and in the display step, the display unit displays the index-item information corresponding to one lengthwise section in which the position in the lengthwise direction of the displayed information bar is designated by using the cursor.

The database-access-interface unit may access a built-in database of an apparatus in which the information retrieval method is performed.

The database-access-interface unit may access a database outside an apparatus in which the information retrieval method is performed.

The database-access-interface unit may use a network to access a database outside an apparatus in which the information retrieval method is performed.

According to the present invention, data can be retrieved without performing key-used inputting by using a keyboard or the like. The need for learning how to perform key-used inputting is eliminated, and anybody can easily perform a retrieval operation in such a way that a dictionary is consulted. Therefore, operability can be improved According to the present invention, information having a bar shape can be divisionally displayed by setting the number of display dots to be proportional to a display area.

According to the present invention, a dictionary file in a built-in database of an information retrieval apparatus can be accessed for information retrieval.

According to the present invention, a dictionary file in a database which is externally connected to an information retrieval apparatus can be accessed for information retrieval.

According to the present invention, a dictionary file in a database which is externally connected via a network to an information retrieval apparatus can be accessed for information retrieval.

BRIEF DESCRIPTION OF THE DRAWINGS

FIG. 2 is an illustration of a database access list in which the row A indicates "TOWN PAGES", the row B indicates "NEW-WORD DICTIONARY", the row C indicates "SLANG DICTIONARY", the row D indicates "JAPANESE-ENGLISH DICTIONARY PLUS", and the row E indicates an area for additional database information;

DESCRIPTION OF THE PREFERRED EMBODIMENTS

An information retrieval apparatus according to an embodiment of the present invention displays bars corresponding to the Japanese syllabary characters "A" to "WA" and the English alphabets "A" to "Z", and performs interface operation to access a retrieval database by designating a position in one bar. This eliminates the need for a keyboard and enables high-speed analog retrieval.

Figure 1:
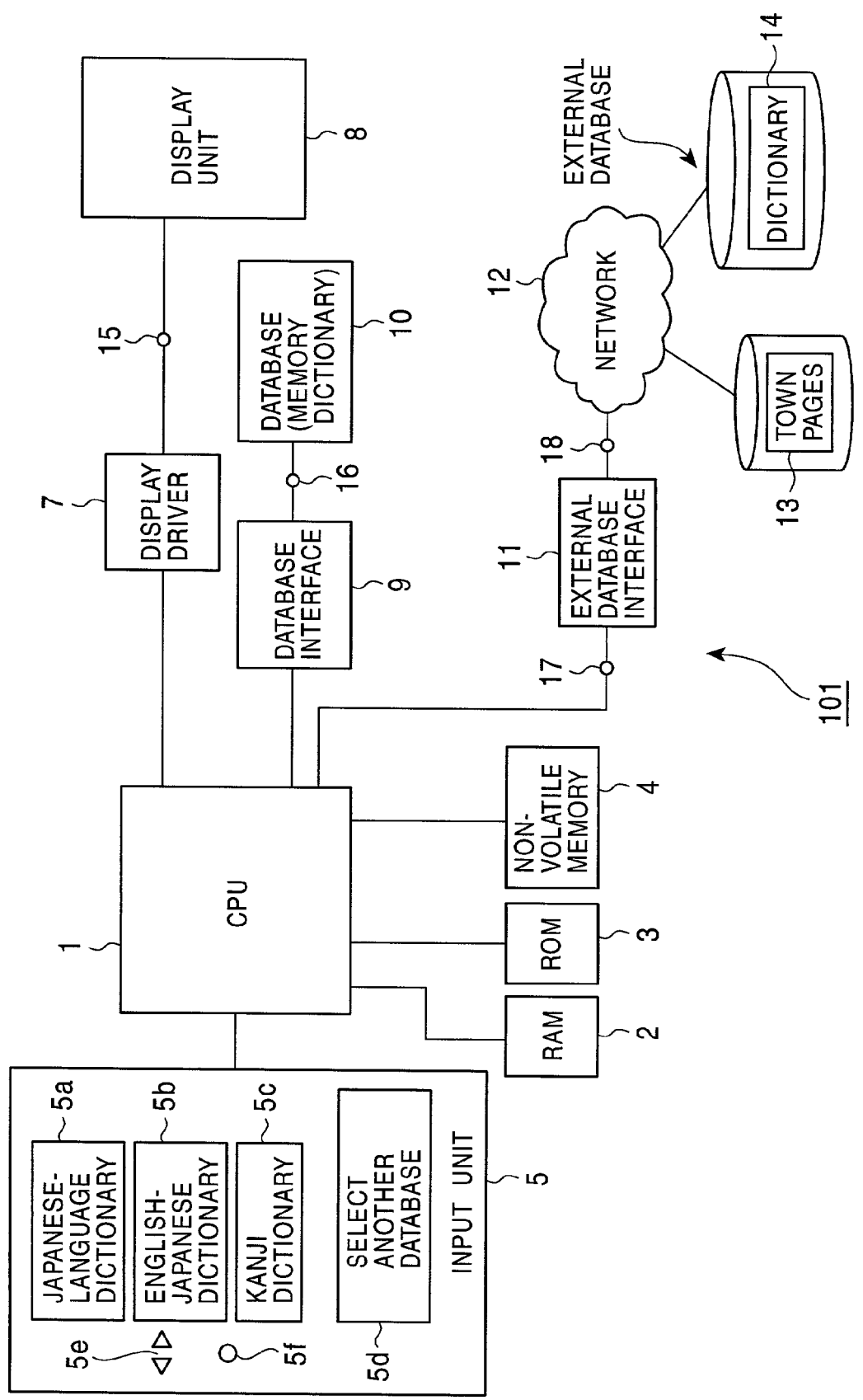
FIG. 1 is a block diagram showing a dictionary searching apparatus to which an embodiment of the present invention is applied.
Figure 4:
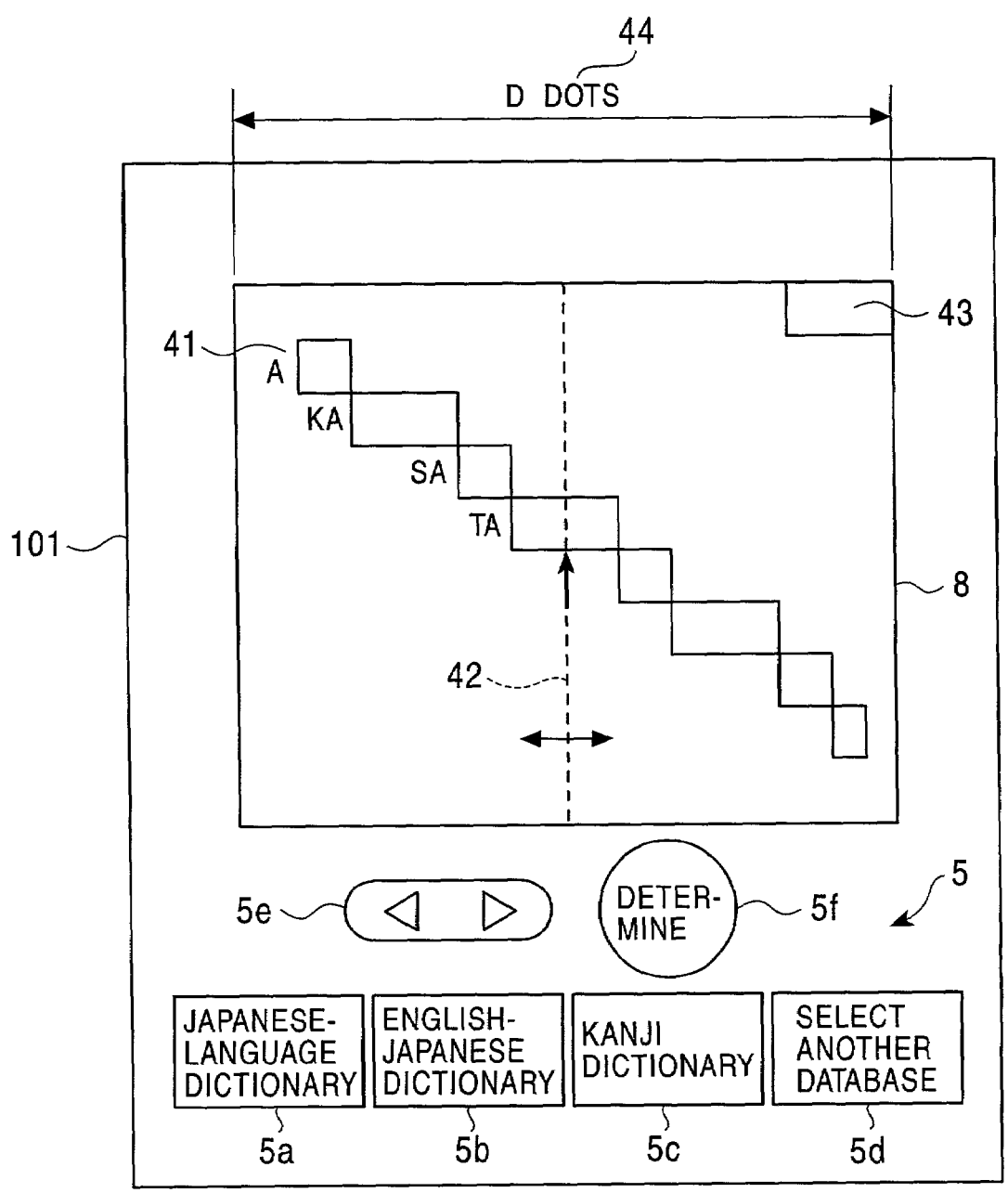
FIG. 4 is an exterior view showing the dictionary searching apparatus shown in FIG. 1.

FIG. 1 is a block diagram showing a dictionary searching apparatus 101 to which the embodiment is applied. FIG. 4 is an exterior view of the dictionary searching apparatus.

The configuration of the dictionary searching apparatus 101 is described below with reference to FIGS. 1 and 4.

Referring to FIG. 1, the dictionary searching apparatus 101 includes a central processing unit (CPU) 1 which controls the operation of the dictionary searching apparatus 101, a random access memory (RAM) 2 which is connected to the CPU 1 and which is used as a work area, a read-only memory (ROM) 3 which is connected to the CPU 1 and which stores a program and data, and a nonvolatile memory 4 which is connected to the CPU 1 and which stores data on an extended database (described later), patch data for modifying the program and data stored in the ROM 3, and operating condition data for returning to the last operating condition when the main power supply of the dictionary searching apparatus 101 is turned on again.

The dictionary searching apparatus 101 also includes an input unit 5 via which a user's request for dictionary search is input to the CPU 1, a display unit 8 for displaying the result of search and the data required for retrieval, a display driver 7 for converting output data from the CPU 1 into an electric signal form which is requested by the display unit 8.

Referring to FIG. 4, the display unit 8 displays major index items and corresponding bars 41 and displays a minor index item in a minor index display portion 43. The screen displayed on the display unit 8 has a predetermined number 44 of display dots (D dots).

The dictionary searching apparatus 101 also includes a database interface 9 for accessing a database 10 such as an electronic dictionary stored in a memory (described later), and an external database interface 11 for retrieving data by using a network 12 to access external databases on external servers, such as the telephone number database "TOWN PAGES" (Japanese telephone-directory name corresponding to the Yellow Pages in the United States) 13 and a dictionary 14 of various types of information. The database interface 9 and the external database interface 11 are connected to the CPU 1 and can operate under control of the CPU 1.

The input unit 5 includes a keyboard composed of key switches, and a touch panel displayed on a liquid crystal display screen. The input unit 5 includes input portions having database names. In this example, a "JAPANESE-LANGUAGE DICTIONARY" key 5a, an "ENGLISH-JAPANESE DICTIONARY" key 5b, a "KANJI DICTIONARY" key 5c, an arrow key 5e for moving a cursor 42, a "DETERMINE" key 5f for designating the determination of an operation, and a "SELECT ANOTHER DATABASE" key 5d are provided.

By using the arrow key 5e to move both the vertical dotted line and the cursor 42 (indicated by the vertical arrow shown in FIG. 4) in a horizontal direction (indicated by the horizontal arrows shown in FIG. 4) along the major index items and bars 41, a search position can be designated.

The display driver 7 controls not only the display function of the display unit 8 as a standard unit provided in the dictionary searching apparatus 101, but also the display function of an external display unit (not shown) which can be removably connected to a contact 15 so as to be provided in the dictionary searching apparatus 101.

The database interface 9 can access not only the database 10 as a standard unit provided in the dictionary searching apparatus 101, but also another database (not shown) which can be removably connected to a contact 16 so as to be provided in the dictionary searching apparatus 101. The database interface 9 can also access an external database in a server on the Internet in such a way that a network-access interface unit having an interface function capable of communicating with the database interface 9 is connected to the contact 16.

The external database interface 11 can be removably connected to the dictionary searching apparatus 101 by a contact 17. The external database interface 11 can access an external database (not shown) by using a dial-up service of an Internet provider via a modem to establish connection to the Internet in accordance with the point-to-point (PPP) protocol. The external database interface 11 can also access an external database (not shown) which is located on the Internet or is connected to an intranet by using a network interface such as the Internet, for example, an in-house local area network (LAN).

The operation of the dictionary searching apparatus 101 is described below.

Figure 12:
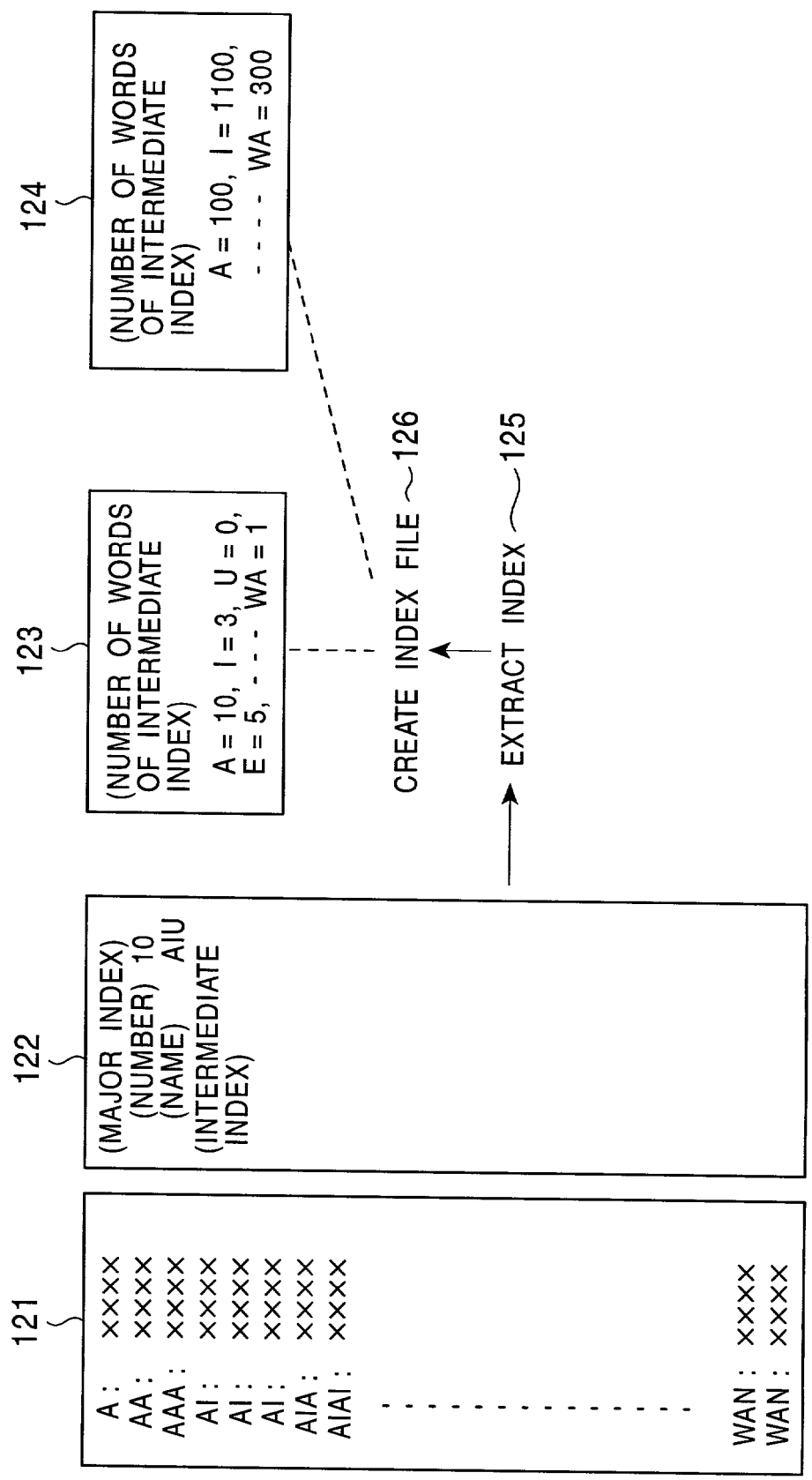
FIG. 12 is an illustration of a dictionary data structure and the creation of an index file.

When the user presses one of the JAPANESE-LANGUAGE DICTIONARY key 5a, the ENGLISH-JAPANESE DICTIONARY key 5b, and the KANJI DICTIONARY key 5c, the CPU 1 uses the database interface 9 to access corresponding one among a Japanese-language-dictionary file, an English-Japanese-dictionary file, and a kanji-dictionary file included in the dictionary file 121 shown in FIG. 12 which is stored in the database 10.

When the user presses the SELECT ANOTHER DATABASE key 5d, the CPU 1 accesses one of external databases other than the database 10 based on the database access list shown in FIG. 2 which is stored in the nonvolatile memory 4.

The database-name column shown in FIG. 2 contains official database names which are displayed on the display unit 8. The abbreviation column shown in FIG. 2 contains file names which are used to selectively access a database. The location column shown in FIG. 2 contains locations in which the external databases exist. The interface column shown in FIG. 2 contains interface types for use in database accessing.

The user ID column shown in FIG. 2 contains IDs assigned to the users of the databases. When a database requests a user ID, a corresponding user ID is sent to the database. Each password shown in FIG. 2 corresponds to each user ID and is data which is sent to a database when it requests authentication. The memo column shown in FIG. 2 is provided for the user to freely write database-related information, and the information can be displayed in response to the user's request.

The row A of the list in FIG. 2 indicates "TOWN PAGES" as a database name, "town.db" as an abbreviation, "10.123.246.1" as a location-indicating IP address, "82" as a port number, "010" as an interface type representing the Ethernet network, "9988765" as an user ID specifying a database user, "aBC012Z" as a database password, and "CHARGE-FREE" as a memo written by the user.

This indicates that an interface having the interface number 010 is used in order to access a database at the port number 82 of the IP address 10.123.246.1 via the Ethernet network. When the database requests transmission of the user ID and the password for authentication, "9988765" and "aBC012Z" are transmitted. The row A also indicates that the database having the abbreviation "town.db" is accessed by using a service using the port number 82 of the IP address 10.123.246.1.

The row B of the list in FIG. 2 indicates "NEW-WORD DICTIONARY" as a database name, "neww.db" as an abbreviation, "10.123.246.1" as a location-indicating IP address, "1080" as a port number, "010" as an interface type representing the Ethernet network, "YY0123" as an user ID specifying a database user, "Ace002Z" as a database password, and "PAYMENT BY CARD" as a memo written by the user.

The row C of the list in FIG. 2 indicates "SLANG DICTIONARY" as a database name, "slang.db" as an abbreviation, "0378901234" as a location-indicating telephone number, "1080" as a port number, "135" as an interface type representing a modem, "SnylPod" as an user ID specifying a database user, and "SERVICE PERIOD 10:00–22:00" as a memo written by the user.

In the case of the row C, nothing is stored as a database password. Accordingly, when the database requests the user to input a password, a message for requesting the user to input the password is displayed on the display unit 8 so that the user can input the password from the input unit 5.

The row D of the list in FIG. 2 indicates "ENGLISH-JAPANESE DICTIONARY PLUS" as a database name, "e2jp.db" as an abbreviation, "013" as a location-indicating add-in memory card, "1080" as a port number, "001" as an interface type representing an add-in memory interface, and "10 MB" as a memo written by the user.

In the case of the row D, both the user ID and the database password are not stored. In addition, the row D of the list in FIG. 2 indicates that no database name is stored.

Figure 3:
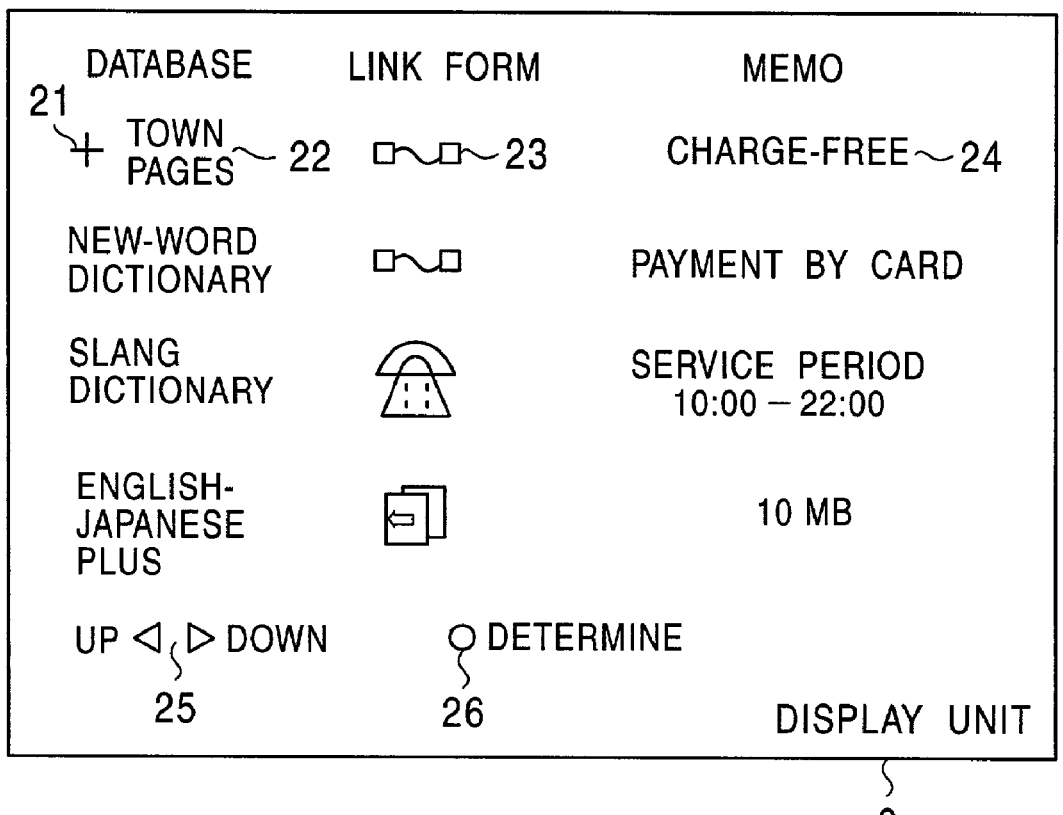
FIG. 3 is an illustration of the database access list shown in FIG. 2.

When the SELECT ANOTHER DATABASE key 5d of the input unit 5 is pressed, the CPU 1 reads the database access list from the nonvolatile memory 4 and displays the screen shown in FIG. 3 on the display unit 8.

Referring to FIG. 3, a currently recorded database name is displayed as a database name 22. A link form 23 is displayed in the form of an icon. For example, when the database name is "TOWN PAGES", the link form 23 indicates the Ethernet network. When the database name is "SLANG DICTIONARY", the link form 23 indicates the use of a modem via a telephone line. When the database name is "ENGLISH-JAPANESE DICTIONARY PLUS", the link form 23 indicates the use of an add-in memory interface.

In FIG. 3, a memo portion 24 displays a memo entered by the user. A cursor 21 is used to indicate which database is selected. An arrow key 25 is used to indicate a direction in which the cursor 21 moves for selecting a database name. When a "DETERMINE" key 26 is pressed, the database selection is determined.

The operation of displaying the accessing of a database is described below by exemplifying the case of using the NEW-WORD DICTIONARY.

When the user presses the SELECT ANOTHER DATABASE key 5d of the input unit 5, the database access list shown in FIG. 2 is displayed on the display unit 8. By using the arrow key 5e to vertically move the cursor 21, the user puts the cursor 21 in a position where the NEW-WORD DICTIONARY is selected and presses the DETERMINE key 5f.

When the CPU 1 detects the pressure of the DETERMINE key 5f, the CPU 1 reads an interface for use in accessing the NEW-WORD DICTIONARY from the database access list. The CPU 1 detects the connection to the external database interface 11 of the Ethernet network indicated by the number "010", and controls the external database interface 11 to access a location indicated by the IP address "10.123.246.1" read from the database access list.

At this time, "1080" is specified as a port number for a service. When the external database interface 11 is connected to a new-word-dictionary database in the dictionary 14, the database sends a request to input a user ID and a password. When receiving this request, the CPU 1 reads a user ID and a password for accessing the NEW-WORD DICTIONARY from the database, and sends the user ID and the password to the database, whereby authentication is established.

This makes it possible to use the new-word-dictionary database, and a screen for consulting the dictionary is output. In the case of the new-word-dictionary database, the user is charged whenever data is captured from the dictionary, and the accounting information is sent to, for example, a server of a credit card company.

In a case in which the creation of a new database is displayed when the new-word-dictionary database is accessed, the user can add the database information to the database access list. In the case, the database information is stored in the above row E of the database access list which does not contain any database information.

Figure 6:
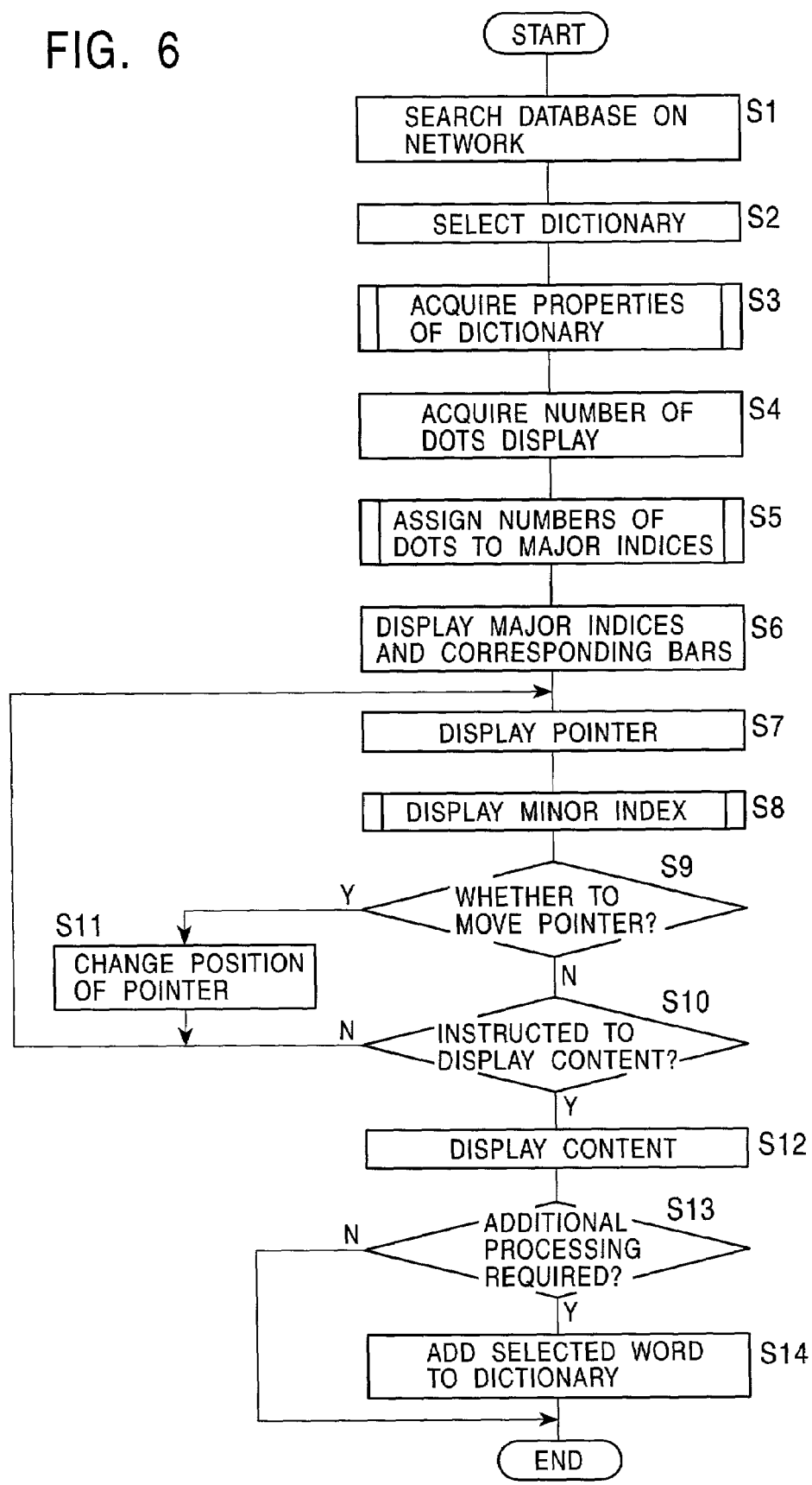
FIG. 6 is a flowchart showing the operation of the dictionary searching apparatus shown in FIG. 1.

The operation of the dictionary searching apparatus 101 is described below with reference to the flowchart shown in FIG. 6.

In step S1, a database on a network is searched. Specifically, when the user presses the SELECT ANOTHER DATABASE key 5d of the input unit 5, based on the database access list shown in FIG. 2 which is stored in the nonvolatile memory 4, the CPU 1 accesses a database other than the predetermined database 10. When the user does not presses the SELECT ANOTHER DATABASE key 5d, step S1 is skipped.

In step S2, a dictionary is selected. Specifically, when the user presses one of the JAPANESE-LANGUAGE DICTIONARY key 5a, the ENGLISH-JAPANESE DICTIONARY key 5b, and the KANJI DICTIONARY key 5c, the CPU 1 uses the database interface 9 to access corresponding one among the Japanese-language-dictionary file, the English-Japanese-dictionary file, and the kanji-dictionary file included in the dictionary file 121 shown in FIG. 12 which is stored in the database 10. In step S, when the database is searched, the CPU 1 accesses the TOWN PAGES, NEW-WORD DICTIONARY, SLANG DICTIONARY, and ENGLISH-JAPANESE DICTIONARY PLUS databases shown in FIG. 2.

Figure 7:
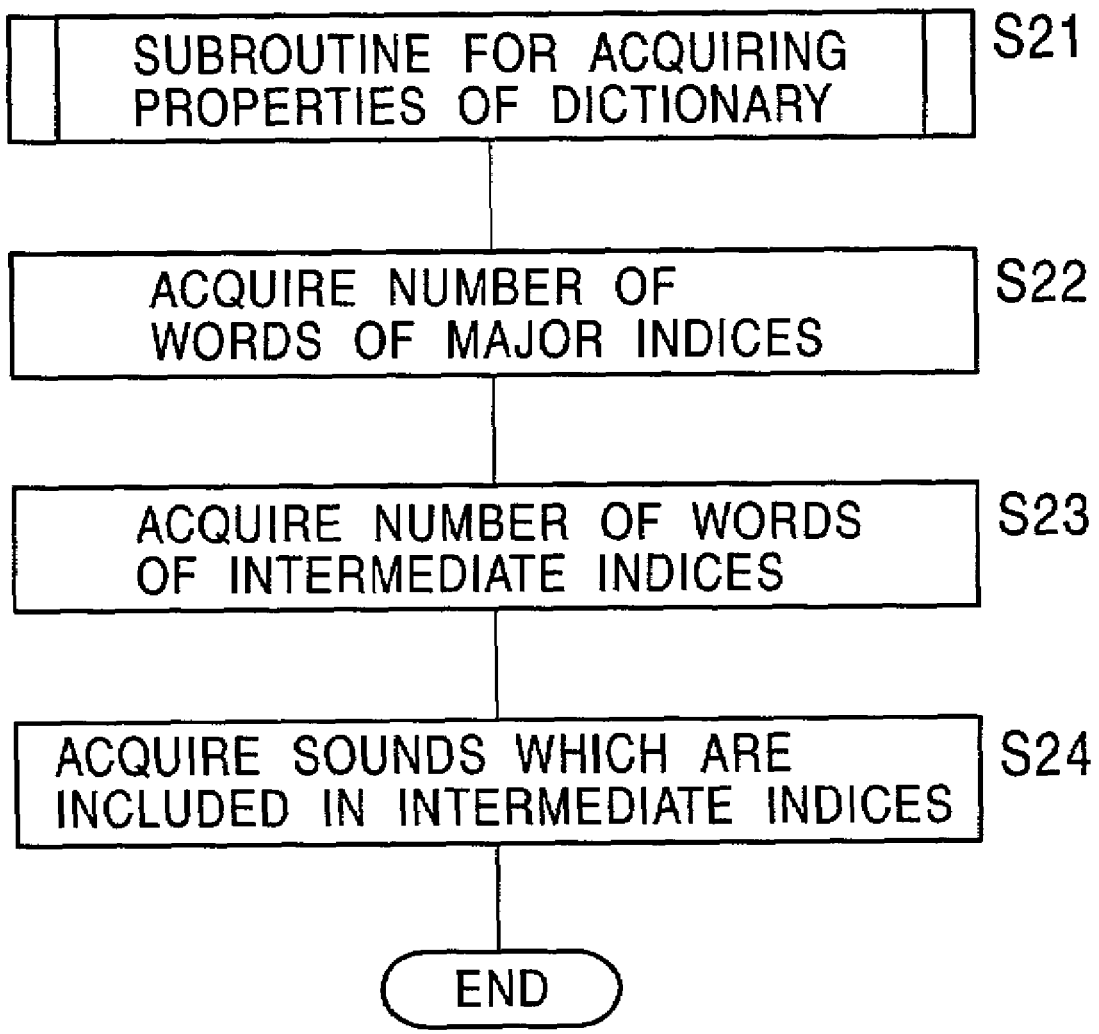
FIG. 7 is a flowchart showing a subroutine for acquiring the properties of a dictionary.

In step S3, the properties of the dictionary are acquired. Specifically, as FIG. 7 shows, a subroutine for acquiring the properties of the dictionary starts in step S21. In step S22, the number of words constituting the major index items is acquired from a main-dictionary-index file 122 included in the dictionary file 121 shown in FIG. 12. In step S23, the number of the intermediate index items is acquired. In step S24, sounds included in the intermediate index items are acquired. By performing the subroutine in FIG. 7, after index-item extraction is performed as denoted by reference numeral 125 in FIG. 12, a user-dictionary-index file 123 is created or a network-database-index file 124 is created on the server, as denoted by reference numeral 126. This makes it possible to know the properties of the dictionary, such as the number of words constituting the major index items and the number of words constituting the intermediate index items. The user-dictionary-index file 123 has a function in which, when an internal database is accessed, the result of retrieval can be stored. The network-database-index file 124 has a function in which, when an external database is accessed by network, the result of retrieval can be stored.

Figure 5:
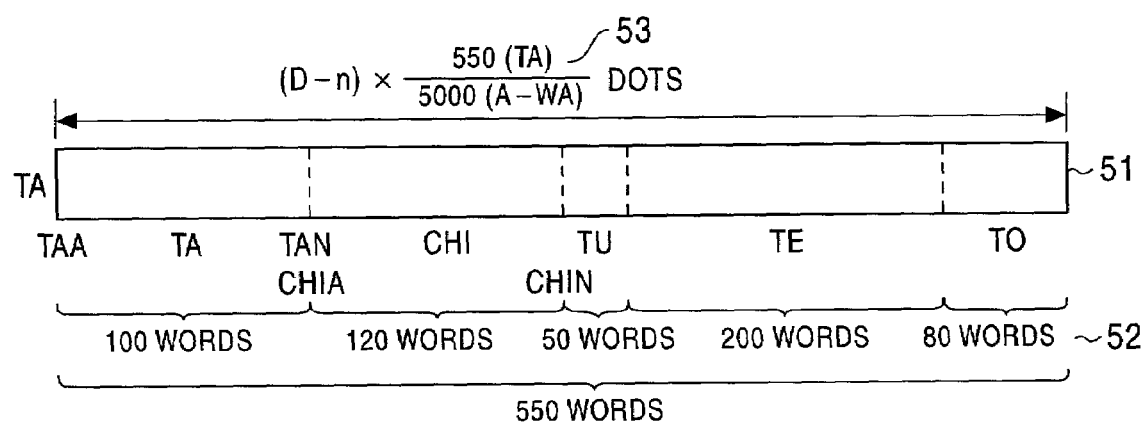
FIG. 5 is an illustration of the numbers of display dots in a major index item.

In step S4, the numbers of display dots are acquired. FIG. 5 shows the number of display dots of a major index item bar. In FIG. 5, the number "53" of display dots corresponding to the bar 51 of the major index item "TA" is the product obtained by multiplying the number "D−n" of displayable dots ("n" represents the number of dots constituting the display area and reserve area of the first major index item) by a ratio of the total number of (5000) words ("A" to "WA") to the number of words included in the bar 51 of the major index item "TA". Accordingly, the display area of the major index item "TA" can be reserved. In the major index item "TA" having a length of 550 words, the intermediate index item "TA" has a length of 100 words, the intermediate index item "CHI" has a length of 120 words, the intermediate index item "TSU" has a length of 50 words, the intermediate index item "TE" has a length of 200 words, and the intermediate index item "TO" has a length of 80 words. Similarly, the numbers of display dots of bars corresponding to the other major index items can be found.

Figure 8:
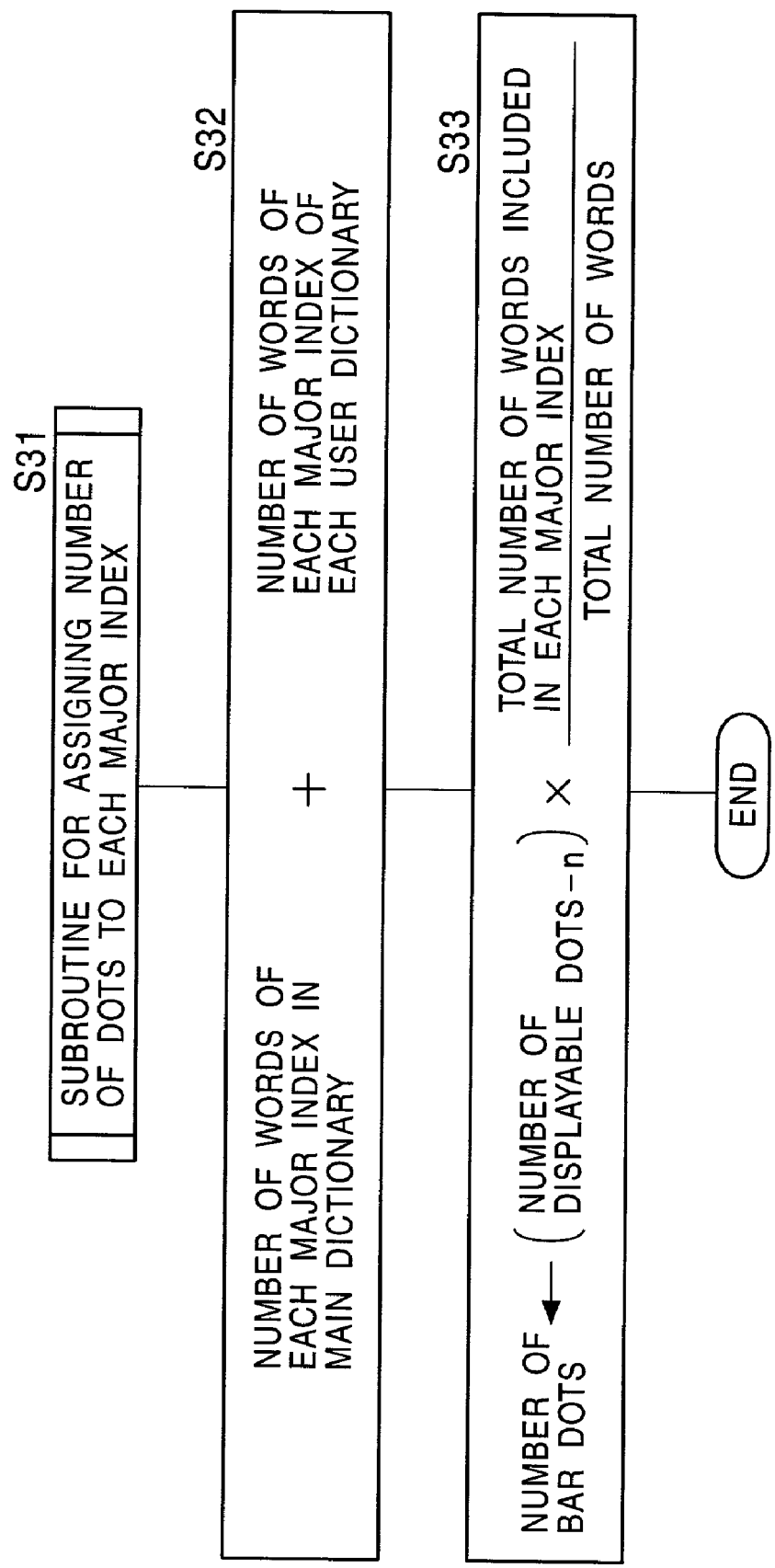
FIG. 8 is a flowchart showing a subroutine for assigning the number of dots to each major index item.

In step S5, the numbers of dots are assigned to the major index items. Specifically, as FIG. 8 shows, a subroutine for assigning the number of dots to each major index item starts in step S31. In step S32, the CPU 1 finds the sum of the number of words constituting each major index item in the main dictionary and the number of words constituting each major index item in each user dictionary. In step S33, the number of dots for each bar is calculated by the following expression:

$$\left(\begin{array}{c}\text{NUMBER OF}\\\text{DISPLAYABLE DOTS}-n\end{array}\right)\times\frac{\text{NUMBER OF WORDS INCLUDED IN EACH MAJOR INDEX}}{\text{TOTAL NUMBER OF WORDS}}$$

As the above expression shows, the number of dots for each bar is calculated such that a value obtained by subtracting n (the number of dots constituting the display area and reserve area of the first major index item) from the number of displayable dots is multiplied by a ratio of the number of words included in each major index item to the total number of words. For example, when the number D of displayable dots is 1000 and the number of entries is ten thousand, one dot for each of the entries corresponds to a bar for ten entries.

In step S6, the major index items and bars 41 are displayed. Specifically, the CPU 1 displays the major index items and bars 41 on the display unit 8, as shown in FIG. 4, based on the assignment of dots to each major index item which is described using FIG. 8.

In step S7, a pointer is displayed. Specifically, the CPU 1 uses the cursor 42 (shown in FIG. 4) to display a pointer on the display unit 8.

Figures 9, 10:
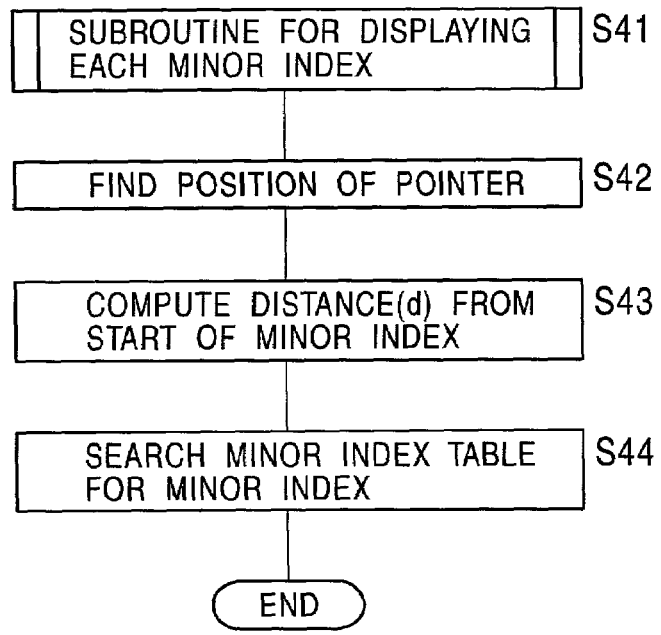
FIG. 9 is a flowchart showing a subroutine for displaying each minor index item.
FIG. 10 is an illustration of a minor index table.

In step S8, the minor index item is displayed. Specifically, as FIG. 9 shows, a subroutine for displaying each minor index item starts in step S41. In step S42, based on the position of the cursor 42 to the D display dots in FIG. 11, the CPU 1 finds the number of dots which represents the position of the pointer. In step S43, based on the length of each major index item and minor index item, a distance "d" from the start of the bars is calculated. In step S44, the CPU 1 searches the minor index table 102 shown in FIG. 10 for a minor index item corresponding to the distance d, that is, the number of words from the start point.

The minor index table 102 shown in FIG. 10 is formed such that each distance 104 (represented by the number of words) from the start point to each minor index item 103 is stored in the RAM 2. As shown in FIG. 10, the distance 104 from the start to the minor index item "AA" is 1 word. The distance 104 from the start to the minor index item "AI" is 50 words. The distance 104 from the start to the minor index item "AU" is 83 words. The distance 104 from the start to the minor index item "TSUI" is 2500 words. The distance 104 from the start to the minor index item "TSUU" is 2531 words.

However, by using each distance 104 from the start (in FIG. 10) as a "width", the distance to a destination may be found by totaling the widths.

Figure 11:
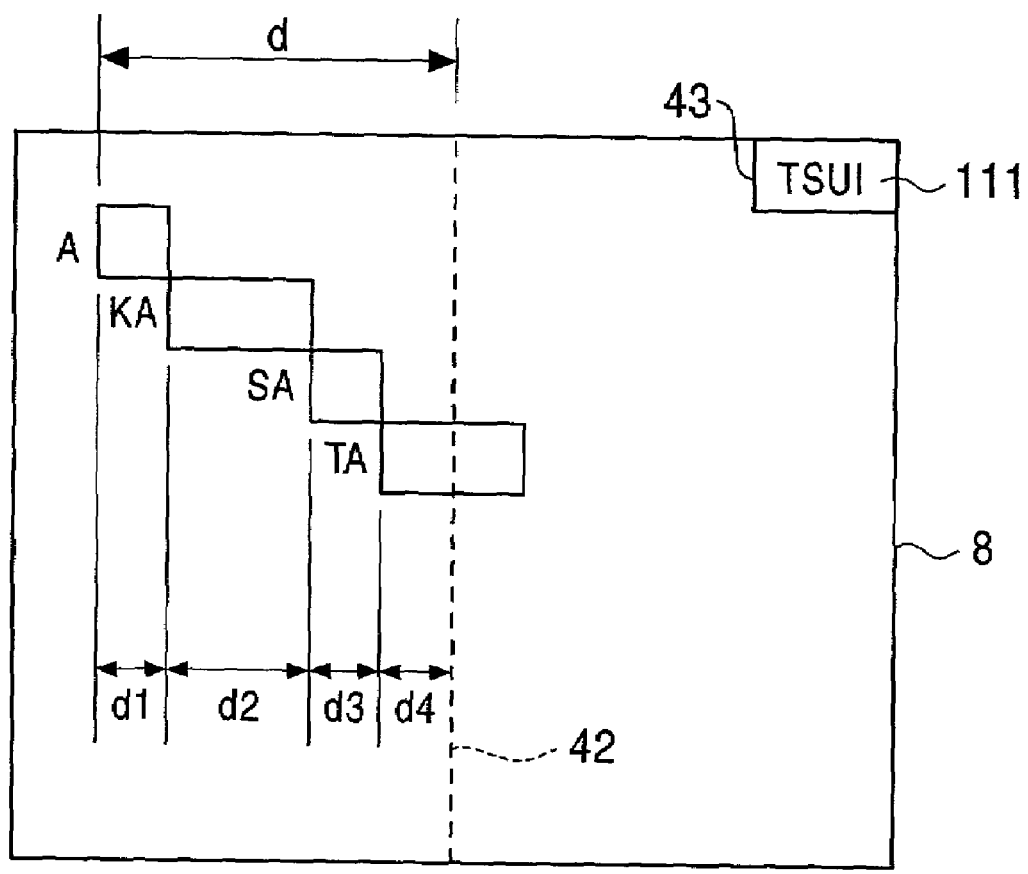
FIG. 11 is an illustration of a displayed minor index item.

As FIG. 11 shows, the distance d from the first index item "A" to the cursor 42 is the sum of a distance d1 corresponding to the index item "A", a distance d2 corresponding to the index item "KA", a distance d3 corresponding to the index item "SA", and the distance d4 from the index item "TA" to the cursor 42. At this time, the minor index item 111 "TSUI" in the index item "TA" which is designated by the cursor 42 is displayed in a minor index item display portion 43.

In step S9, the CPU 1 determines whether or not the pointer 42 is moved. Specifically, the CPU 1 determines whether the arrow key 5e has been pressed which controls the cursor 42 to move.

If the CPU 1 has determined in step S9 that the pointer 42 is moved, the position of the pointer 42 is changed in step S11. Specifically, if the CPU 1 has detected pressure of the arrow key 5e, it performs processing for displaying the cursor 42 at the changed position. After that, the CPU 1 returns to step S7, and repeatedly performs steps S7 to S9.

If the CPU 1 has determined in step S9 that the pointer 42 is not moved, it determines in step S10 whether it has been instructed to display details. Specifically, the CPU 1 determines whether the DETERMINE key 5f has been pressed.

If the CPU 1 has determined in step S10 whether it has been instructed to display details, the details are displayed in step S12. Specifically, the CPU 1 displays a list of entries included in the minor index item 111 on the display unit 8. By pressing the DETERMINE key 5f after using the cursor 42 to perform fine adjustment of selection in the list, details about the selected entry are displayed.

In step S13, the CPU 1 determines whether or not additional processing is required. Specifically, the CPU 1 determines whether or not a predetermined key (not shown) of the input unit 5 has been pressed which designates the additional processing.

If the CPU 1 has determined in step S13 that the additional processing is required, it stores the selected entry in the user dictionary. Specifically, the CPU 1 controls the user-dictionary-index file to store information on a word obtained by the above retrieval. When another database is selected, the information is stored in the network-database-index file on the server.

In the above embodiment, only the Internet is used as the network 12. However, the network 12 is not limited thereto, but a wireless network composed of predetermined communication stations may be used.

In the above embodiment, a personal computer or a personal digital assistant may be used as the dictionary searching apparatus 101.

Although the above embodiment shows only a case in which the display unit 8 horizontally displays each information bar, the information bar may be vertically displayed on the display unit 8.

Not only data of a single dictionary but also information of two or more dictionaries including a Japanese-language dictionary and a Japanese-English dictionary may be horizontally or vertically displayed in the form of a bar on a single display unit 8.

An information bar representing a single dictionary may be horizontally or vertically displayed on the display unit in a form in which it is divided into a plurality of different lines.

What is claimed is:

1. An information retrieval method for performing information retrieval from an information source, said information retrieval method comprising:
    an input step in which a selective inputting operation is performed;
    a display step for displaying information in the form of an information bar on display means, the displayed information being obtained by using database-access-interface means to access a database from a plurality of databases including first and second dictionaries as said information source for information retrieval in response to an execution of said input step, wherein said information bar is displayed as a plurality of lengthwise sections each corresponding to index-information and being displayed in a staircase pattern, and wherein a length of each lengthwise section corresponds to a quantity of the index-information therein;
    a cursor moving step for moving a cursor in response to the execution of said input step in order to designate a position in a lengthwise direction of the information bar displayed in a staircase pattern; and
    a retrieval step for retrieving information corresponding to the designated position from said database by using said database-access-interface means,
    wherein the retrieved information is displayed on said display means, and
    wherein the length of said information bar is determined by the number of displayable dots and the number of information in each information bar.

2. The information retrieval method according to claim 1, wherein:
    in said display step, said display means displays the index-item information corresponding to one of the plurality of lengthwise sections in which the position in the lengthwise direction of the displayed information bar is designated by using said cursor.

3. The information retrieval method according to claim 1, wherein said database-access-interface means accesses a built-in database of an apparatus in which said information retrieval method is performed.

4. The information retrieval method according to claim 1, wherein said database-access-interface means accesses a database outside an apparatus in which said information retrieval method is performed.

5. The information retrieval method according to claim 1, wherein said database-access-interface means uses a network to access a database outside an apparatus in which said information retrieval method is performed.

6. An information retrieval apparatus for performing information retrieval from an information source, said information retrieval apparatus comprising:
    input means in which a selective inputting operation is performed;
    database-access-interface means which accesses a database from a plurality of databases including first and second dictionaries as said information source for retrieving information in response to a use of said input means;
    display means for displaying, in a form of an information bar, information that is obtained by accessing said database by said database-access-interface means, wherein said information bar consists of a plurality of lengthwise sections each corresponding to index-item information and being displayed in a staircase pattern, and wherein a length of each lengthwise section corresponds to a quantity of the index-item information therein;
    cursor moving means for moving a cursor in response to the use of said input means in order to designate a position in a lengthwise direction of the information bar displayed in a staircase pattern by said display means; and
    retrieval means for retrieving information, corresponding to the designated lengthwise position, from said database by using said database-access-interface means,
    wherein the retrieved information is displayed on said display means, and
    wherein the length of said information bar is determined by the number of displayable dots and the number of information in each information bar.

7. The information retrieval apparatus according to claim 1, wherein:
    said display means displays the index-item information corresponding to one of the plurality of lengthwise sections in which a position in the lengthwise direction of the displayed information bar is designated by using said cursor moving means.

8. The information retrieval apparatus according to claim 1, further comprising a built-in database accessed by said database-access-interface means.

9. The information retrieval apparatus according to claim 1, wherein said database-access-interface means accesses a database outside said information retrieval apparatus.

10. The information retrieval apparatus according to claim 1, wherein said database-access-interface means uses a network to access a database outside said information retrieval apparatus.

* * * * *

UNITED STATES PATENT AND TRADEMARK OFFICE
CERTIFICATE OF CORRECTION

PATENT NO. : 7,054,865 B2 Page 1 of 1
APPLICATION NO. : 10/027973
DATED : May 30, 2006
INVENTOR(S) : Yoshikazu Kato and Takeshi Kanai It is certified that error appears in the above-identified patent and that said Letters Patent is hereby corrected as shown below:

Column 10, line 44 delete "1, wherein" and in its place insert --6, wherein--;

Column 10, line 52 delete "1, wherein" and in its place insert --6, wherein--;

Column 10, line 55, delete "1, wherein" and in its place insert --6, wherein--; and Column 10, line 58, delete "1, wherein" and in its place insert --6, wherein--.

Signed and Sealed this

Seventeenth Day of April, 2007

JON W. DUDAS
*Director of the United States Patent and Trademark Office*